United States Patent
Hunter, Jr. et al.

(10) Patent No.: US 11,165,216 B2
(45) Date of Patent: Nov. 2, 2021

(54) ARRANGEMENT OF EXPANDING OPTICAL FLOWS FOR EFFICIENT LASER EXTRACTION

(71) Applicants: Robert O. Hunter, Jr., Aspen, CO (US); Adlai H. Smith, Escondido, CA (US)

(72) Inventors: Robert O. Hunter, Jr., Aspen, CO (US); Adlai H. Smith, Escondido, CA (US)

(73) Assignee: INNOVEN ENERGY LLC, Columbia, MO (US)

(*) Notice: Subject to any disclaimer, the term of this patent is extended or adjusted under 35 U.S.C. 154(b) by 162 days.

(21) Appl. No.: 16/514,153

(22) Filed: Jul. 17, 2019

(65) Prior Publication Data
US 2020/0028313 A1    Jan. 23, 2020

Related U.S. Application Data

(60) Provisional application No. 62/700,572, filed on Jul. 19, 2018.

(51) Int. Cl.
*H01S 3/034* (2006.01)
*H01S 3/0959* (2006.01)
*H01S 3/23* (2006.01)
*G21B 1/23* (2006.01)
*H01S 3/225* (2006.01)

(52) U.S. Cl.
CPC ............ *H01S 3/034* (2013.01); *G21B 1/23* (2013.01); *H01S 3/0959* (2013.01); *H01S 3/2256* (2013.01); *H01S 3/2308* (2013.01); *H01S 3/2333* (2013.01); *H01S 3/2366* (2013.01); *H01S 3/2383* (2013.01); *H01S 2301/02* (2013.01)

(58) Field of Classification Search
CPC ...... H01S 3/034; H01S 3/2383; H01S 3/2308; H01S 3/2333; H01S 3/2366; H01S 3/0959; H01S 3/2256; H01S 2301/02
See application file for complete search history.

(56) References Cited

U.S. PATENT DOCUMENTS

| 4,742,522 A * | 5/1988 | Linford ................. H01S 3/0903 372/101 |
| 10,170,883 B1 | 1/2019 | Hunter, Jr. |

(Continued)

OTHER PUBLICATIONS

Hunter et al., Large Scale Discharge Pumped Molecular Halogen Lasers, AIAA 15th Aerospace Sciences Meeting, Paper 77-26, Los Angeles, CA, 1977.

(Continued)

*Primary Examiner* — Yuanda Zhang

(57) ABSTRACT

A set of optical elements for optical extraction composed of packed expanding optical cross sections to efficiently extract from a large gain region. The elements are rectangular shaped concave small expansion lenses matched to rectangular convex collimating lenses. Absorbing sheets divide an overall large volume up into smaller volumes to minimize losses due to amplified spontaneous emission. This arrangement has various applications, particularly in inertial confinement technology, where it may be used to extract energy from KrF laser media energized by electron beams. For certain applications, this regime of the gain medium may have zones at the absorbing sheets where this is no gain.

16 Claims, 15 Drawing Sheets

(56) References Cited

U.S. PATENT DOCUMENTS

| | | |
|---|---|---|
| 10,211,588 B2 | 2/2019 | Hunter, Jr. |
| 2016/0326667 A1* | 11/2016 | Kolis .................. H01S 3/0612 |
| 2018/0123314 A1 | 5/2018 | Hunter, Jr. |
| 2018/0191120 A1 | 7/2018 | Hunter, Jr. |

OTHER PUBLICATIONS

Rosocha et al., Excimer Lasers for ICF in Nuclear Fusion by Inertial Confinement: A Comprehensive Treatise, CRC Press, Inc., 1993, Ch. 15, pp. 371-420.

Hunter et al., Bidirectional Amplification with Nonsaturable Absorption and Amplified Spontaneous Emission, IEEE Journal of Quantum Electronics, vol. QE-17, No. 9, Sep. 1981, pp. 1879-1887.

Hunter et al., Scaling of KrF Lasers for Inertial Confinement Fusion, Journal of Quantum Electronics, vol. QE-22, No. 3, Mar. 1986, pp. 386-404.

Johnson et al., Physics of the Krypton Fluoride Laser, Journal of Applied Physics, vol. 51, No. 5, May 1980, pp. 2406-2420.

Jacob et al., Expanding Beam Concept for Building Very Large Excimer Laser Amplifiers, Applied Physics Letters, vol. 48, No. 5, Feb. 1986, pp. 318-320.

Cartwright et al., Inertial Confinement Fusion at Los Alamos: Progress Since 1985, Los Alamos National Laboratory, Sep. 1989, LA-UR-89-2675, vol. 1.

Hunter et al., Single Pulse Excimer Ground Based Laser ASAT Concept Definition Study, Thermo Electron Technologies Corporation, Oct. 1989, TTC-1588-R, vol. 1.

\* cited by examiner

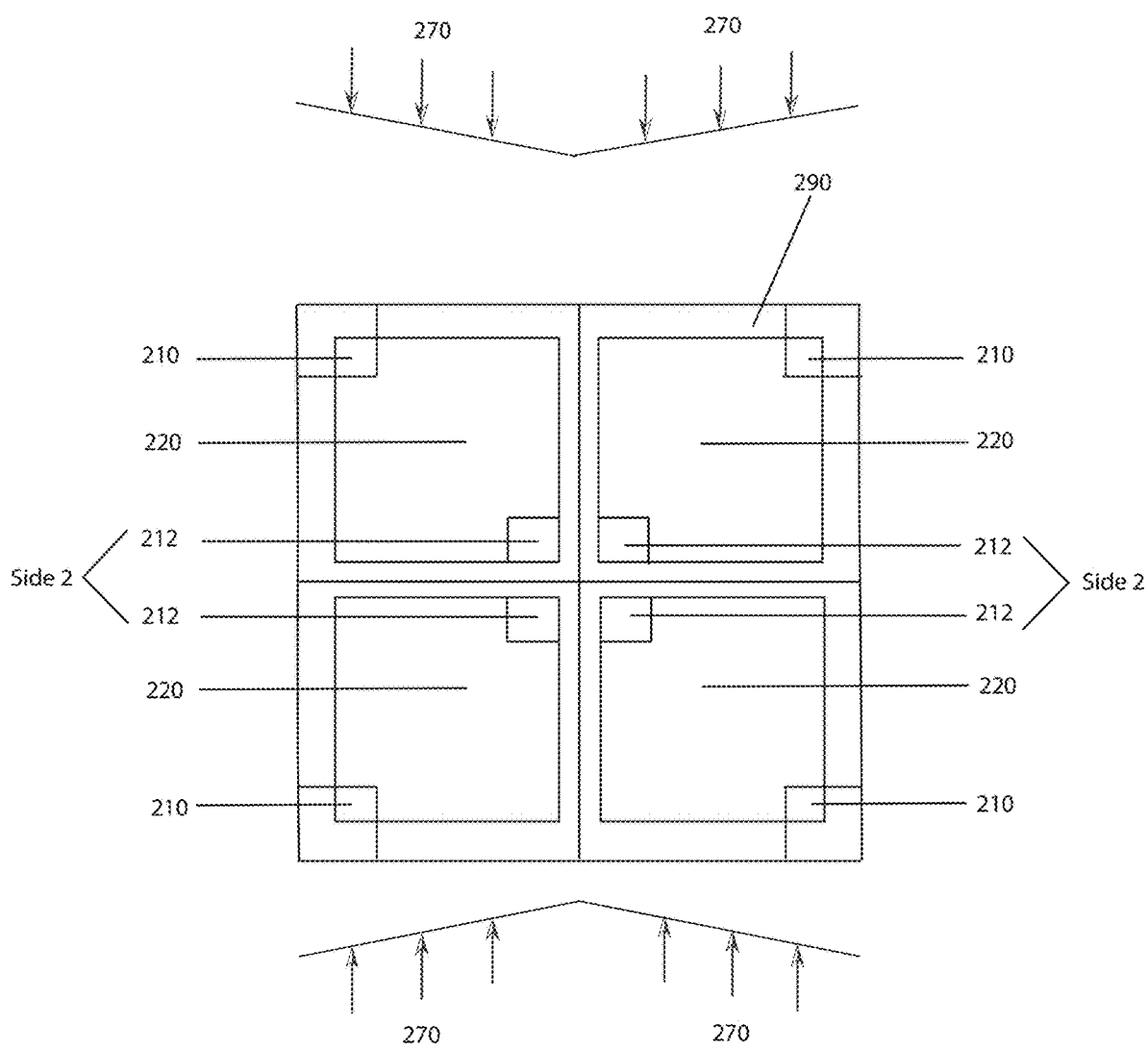

Side 1

Side 2

FIGURE 5
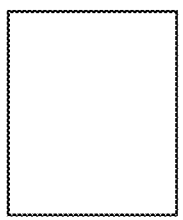
Fig. 5A
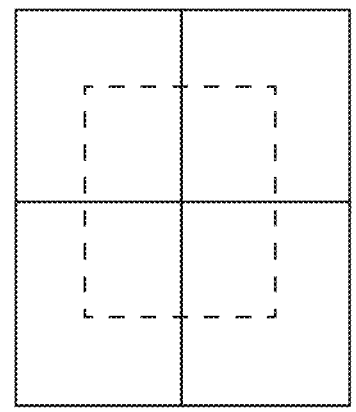
Fig. 5C
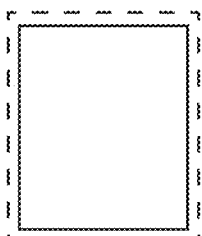
Fig. 5B
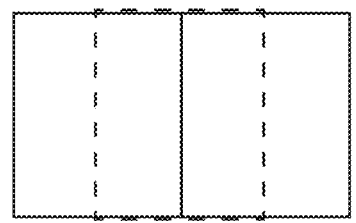
Fig. 5D

FIGURE 6
PERIODIC ARRAYS OF HEXAGONAL APERTURES
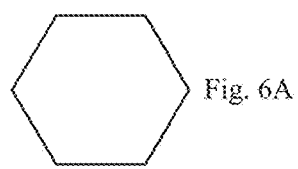
Fig. 6A
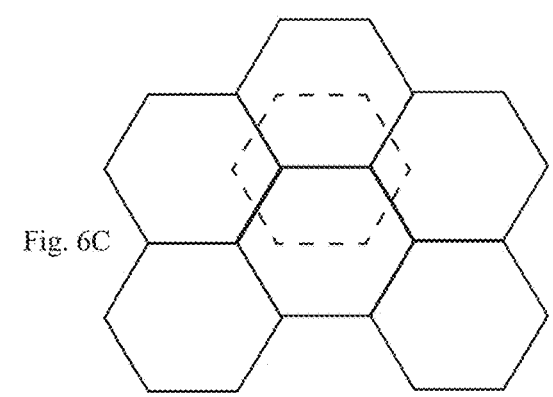
Fig. 6C
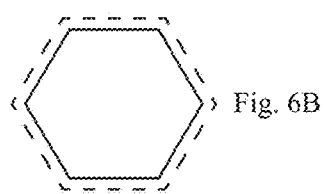
Fig. 6B
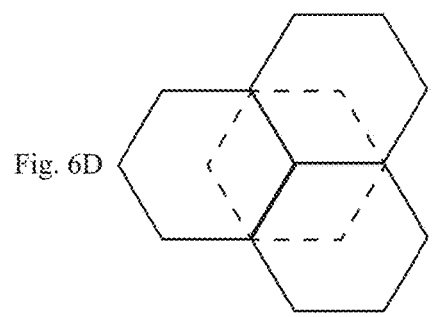
Fig. 6D

FIGURE 7
PERIODIC ARRAYS OF TRIANGULAR APERTURES
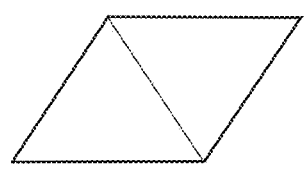
Fig. 7A
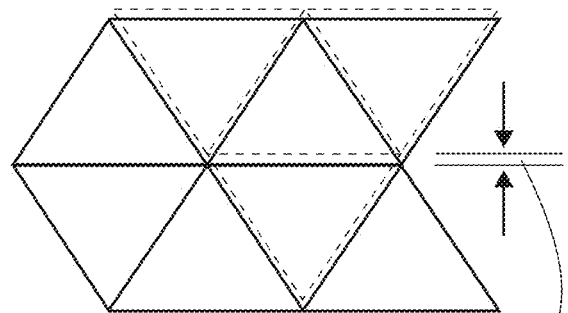
Fig. 7C
700
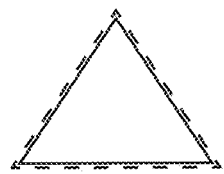
Fig. 7B
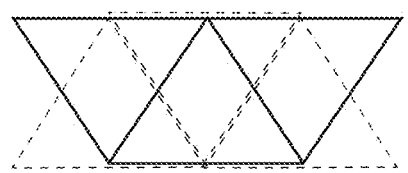
Fig. 7D

ARRANGEMENT OF EXPANDING OPTICAL FLOWS FOR EFFICIENT LASER EXTRACTION

RELATED APPLICATION

This application claims priority to U.S. provisional patent application Ser. No. 62/700,572 titled "Arrangement of Expanding Optical Flows for Efficient Laser Extraction," filed on Jul. 19, 2018, and hereby incorporated by reference.

BACKGROUND

This invention relates to building lasers with large energy outputs, and more particularly to lasers suitable for producing energy from inertial confinement fusion.

In the past 50 years, substantial effort has been spent to producing energy from inertial confinement fusion (ICF) entailing the development of targets, implosion apparatus, and energy recovery. The implosion apparatus has largely been based on glass lasers. So far, no target has produced appreciable net gain (energy out over energy in from the laser greater than 1). To date, such glass lasers have about 0.1% electrical efficiency (laser energy out compared to electrical energy in), so even if a gain of 10-100 of target energy out to laser energy input can be realized, the overall performance is 0.01-0.1, meaning 10 to 100 times as much energy is being used in the laser as is being generated. Also, such lasers cost about $3,000/joule delivered. To compete commercially, such laser drivers should cost on order of $10.00/joule and have an efficiency of the order of 10%. A major candidate among lasers that has good efficiency (0.10) and the potential for such low cost is Krypton-Fluoride (KrF). To date, such lasers cost over $10^2$/joule. Thus, the invention described below is one that, in conjunction with others referenced, can lower the cost to a commercially viable level while retaining the efficiency desired for inertial confinement fusion.

Two leading references for construction of large KrF amplifiers are "*Single Pulse Excimer Ground Based Laser ASAT Concept Definition Study*," by A. M. Hunter, II, and G. Houghton, Thermo Electron Technologies Corporation, October 1989, TTC-1588-R, Vol. I and "*Expanding Beam Concept for Building Very Large Excimer Laser Amplifiers*," by J. H. Jacob, M. Rohni, R. E. Klinkowstein, and S. Singer, Applied Physics Letters, Vol. 48, No. 5, 3 Feb. 1986, pp. 318-320.

"*Single Pulse Excimer Ground Based Laser ASAT Concept Definition Study*," supra. (FIG. 2-27 on Page 2-61) shows the fall off of efficiency with extraction length for various pumping conditions in a large KrF amplifier. This fall off limits the energy from a single amplifier and, hence, increases the numbers of amplifier at a given energy. Also, it limits the optical fluence on the exit optics to a value much less than the damage limit, increasing the output and downstream optical area, and hence cost, as compared to a damage limited optical area. The second reference discusses a single expanding optical beam amplifier and show that the extraction length may be extended. However, the packaging of the illustrated geometry shown does not lend itself to efficient excitation of the medium by the example election beam pumping.

For optical extraction configurations for inertial confinement fusion (ICF) applications, the following criteria are important.

1. The optical train should be inexpensive.
2. The optical train should lend itself to minimum overall cost for the system, including the production of the laser medium, the efficient extraction from the medium, and the tailoring of the laser energy in space and time to correctly drive the target.
3. The optical train should not have a high loss fraction, including amplified spontaneous emission (ASE) and parasitic oscillations.
4. The optical train should have robust tolerance to operating near optical damage levels.

There are tradeoffs involved: for example, the operating optical fluence may be set by damage considerations, not the optimum extraction geometry.

SUMMARY OF INVENTION

The present invention is based on the desire for a KrF laser that separates the laser energy generation and the laser pulse compression and tailoring to obtain minimum cost. Of course, the invention may have application to many other types of lasers as well. Copending applications "*Optical Configurations for Fusion Laser*," by R. O. Hunter, Jr., Aspen, Colo., submitted Dec. 7, 2016, Patent No. 62/497,908, and incorporated by reference, "*Lookthrough Compression Arrangement*," by R. O. Hunter, Jr., Aspen, Colo., submitted Oct. 31, 2016, Patent No. 62/496,885, and incorporated by reference, "Integration of Direct Compressor with Primary Laser Source and Fast Compressor," by R. O Hunter, Aspen, Colo., submitted Jan. 3, 2017, Patent No. 62/177,150, and incorporated by reference, and "*Method for Direct Compression of Laser Pulses with Large Temporal Ratio*", by R. O. Hunter, Aspen, Colo. submitted Jan. 3, 2017, Patent No. 62/498,674, and incorporated by reference, describe the pulse compression and tailoring for the KrF application. This invention is for the low cost, high efficiency generation of the laser beam before it is further compressed and tailored. KrF lasers for the particular application entail a means of electron beam pumping of a gaseous medium that produces an amplification of an input beam. Such laser media have absorbing species (such as F2) as well as gain producing species (KrF*). This gives an optimum optical flux for extracting the laser energy; too high an applied optical flux and the laser energy is absorbed locally by the other species, too low an applied flux, and the excited state spontaneously emits or is quenched without efficiently contributing to the applied laser field. The electron beam pumping laser construction lend themselves to a constant area cross section geometry for the laser medium (see "*Excimer Lasers for ICF*," by L. A. Rosocha, S. J. Dzuchlewski, B. J. Krohn, and J. McLeod, in "*Nuclear Fusion by Inertial Confinement: A Comprehensive Treatise*," G. Velarde, Y. Ronen and J. M. Martinez-Val (Eds), CRC Press, Inc., 1993, Chapter 15, pp. 371-420).

The invention is an optical configuration aimed at maintaining an optimized flux throughout a much larger fraction of the pumped medium volume than conventional arrangements. This is accomplished by an expansion (such as a spherical wavefront) of the optical beam being amplified to keep the amplified signal at an optimum value throughout the pumped volume. The pumped regions may be packed efficiently by dividing the cross section into rectangular, square or other (triangular, hexagonal, round, etc.) elements of linearly varying dimension and injecting and extracting at both ends.

The packing of the region can be facilitated by separating the gain regions by absorbing boundaries into multiple extraction cells, preventing substantial loss by ASE. The length of the extraction geometry is set by the characteristics of the medium in terms of gain and absorption. The optical fluence on the output optics is then set by the geometric length of the segment, the optical pulse length, and the optical flux at which the segment is run. For example, in the case of spherical expansion the angle is set to optimize the total gain of the optical flux as well as the extraction efficiency. The geometric packing efficiency depends on the type of cell. In addition, it may be desirable to concentrate the pumping region entirely within the geometric region optically accessible.

Therefore, it is an object of this invention to provide an efficient output from a large laser.

A further object is to provide a laser energy generator/amplifier module which utilizes multiple expanding optical flow cells.

Another object is to provide an overall laser volume that overcomes problems associated with length and transverse dimension scaling for both ASE and optical damage.

Another object is to provide an efficiently packed laser extraction region matched with respect to the pumping region.

Another object is to provide a high stage gain for each optical cell.

Other objects of the invention will become readily apparent to those skilled in the art from the following description and accompanying drawings.

DESCRIPTION OF THE DRAWINGS

FIG. 3 illustrates the end view of an embodiment of an expanding flow optical configuration made in accordance with the present invention, with multiple spherical optical flow cell tiling.

FIGS. 5a-d show the tiling arrangements for rectangular cells.

FIGS. 6a-d show tiling arrangements for hexagonal cells.

FIGS. 7a-d show tiling arrangements for triangular cells.

DETAILED DESCRIPTION

A. Reference Numerals for Drawings

Figure 1:
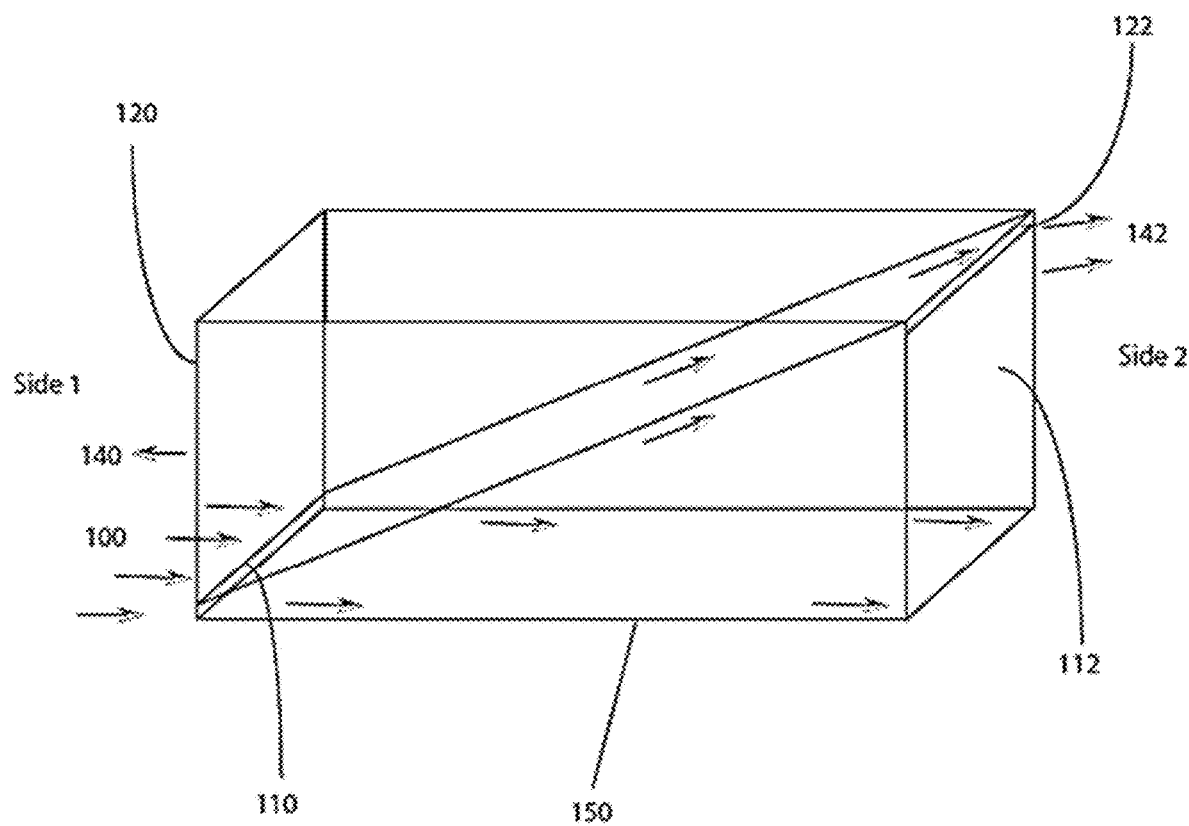
FIG. 1 depicts a two-sided expanding flow geometry, with cylindrical optics.

| REFERENCE NUMERALS | |
|---|---|
| 100 | Input Beam |
| 110 | Input Window/Lens (Side 1) |
| 112 | Output Window/Lens (Side 2) |
| 120 | Output Window/Lens (Side 2) |
| 122 | Input Window/Lens (Side 1) |
| 140 | Output Beam (Side 1) |
| 142 | Output Beam (Side 2) |
| 150 | Gain Medium |
| 200 | Input Beam (Side 1) |
| 202 | Exemplary Ray Entering from Side 1 |
| 204 | Exemplary Ray Entering from Side 1 |
| 206 | Output Ray Exiting through Side 2 |
| 208 | Input Beam (Side 2) |
| 210 | Expansion Optic (Side 1) |
| 212 | Expansion Optic (Side 2) |
| 214 | Exemplary Ray Entering from Side 2 |
| 216 | Exemplary Ray Entering from Side 2 |
| 218 | Output Ray Exiting through Side 1 |
| 220 | Collimating Lens/Output Window (Side 1) |
| 222 | Collimating Lens/Output Window (Side 2) |
| 240 | Output Beam (Side 1) |
| 242 | Output Beam (Side 2) |
| 250 | Gain Medium |
| 260 | Buffer Region |
| 270 | Pumping Electron Beam |
| 280 | Side Material |
| 290 | Window Frame Mount |
| 700 | Offset between the arrays |

B. Terms and Definitions

OPTICAL CELL: Gain medium bounded optically. Usually, in the transverse (perpendicular to the propagation direction(s) of the extraction light by low reflectance materials, and in the parallel dimension by the input and output optical elements (lenses, windows, etc.)), the cell may be shaped to have high geometric overlay to the extracting optical field.

GAIN REGION: The overall significantly pumped volume where gain is produced. It may be subdivided into optical cells and shaped to provide high coupling efficiency.

OPTICAL SEGMENT: Smallest optical unit of expanding optical flow. Set by an input and exit optical element.

C. General Operation and Description

Figure 12:
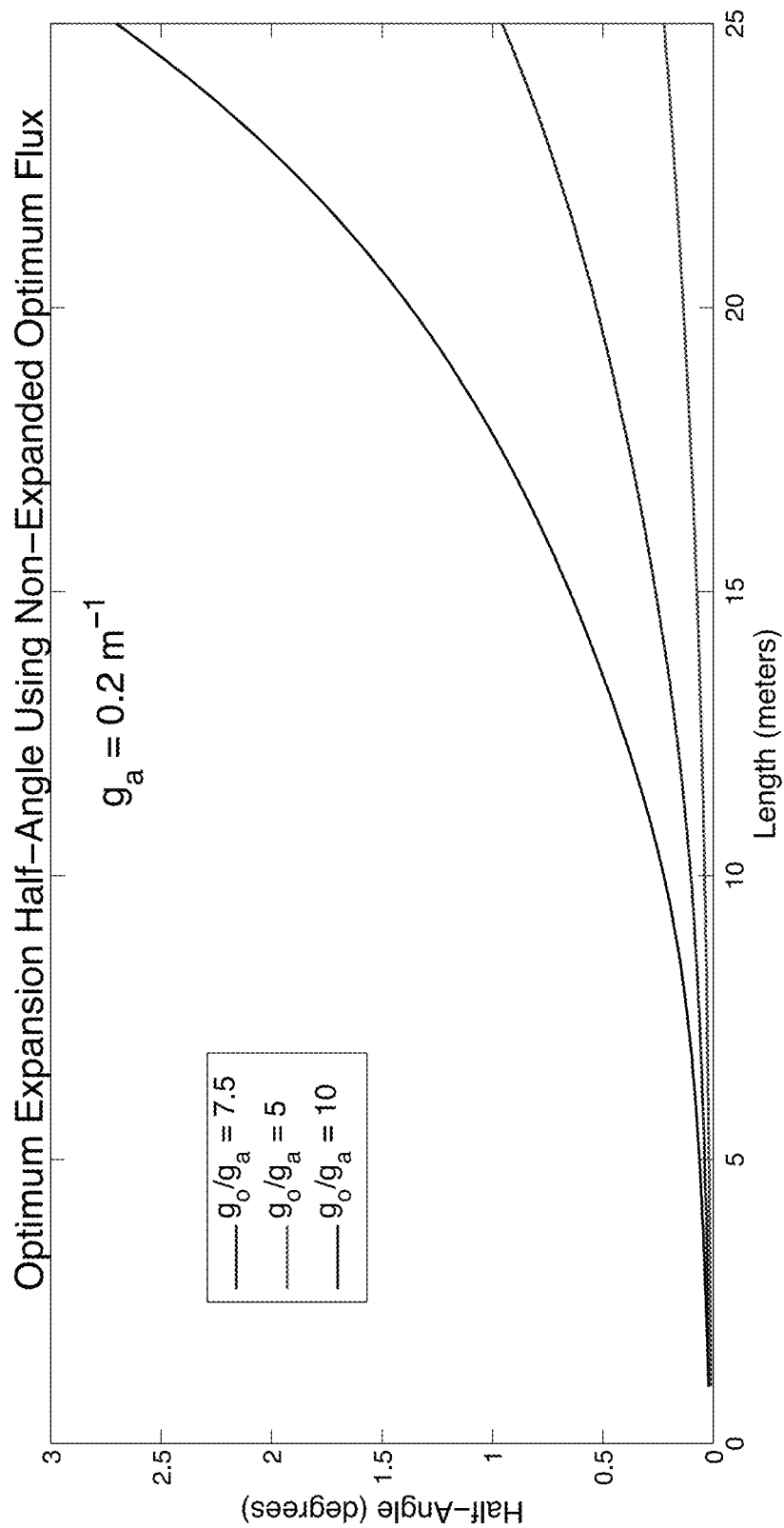
FIG. 12 plots the Optimum expansion half-angle for three cases of gain to absorption.
Figure 13:
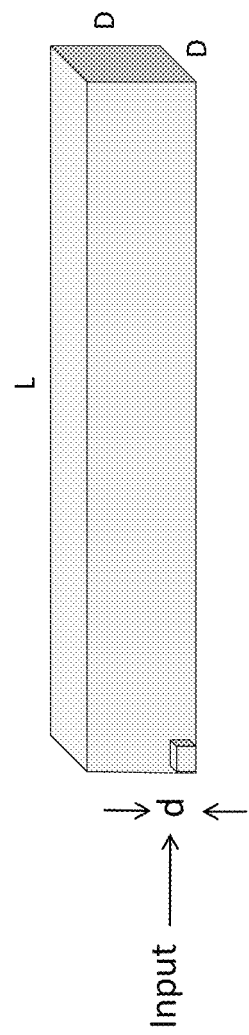
FIG. 13 illustrates the Amplified Spontaneous Emission (ASE) geometry for KrF.
Figure 14:
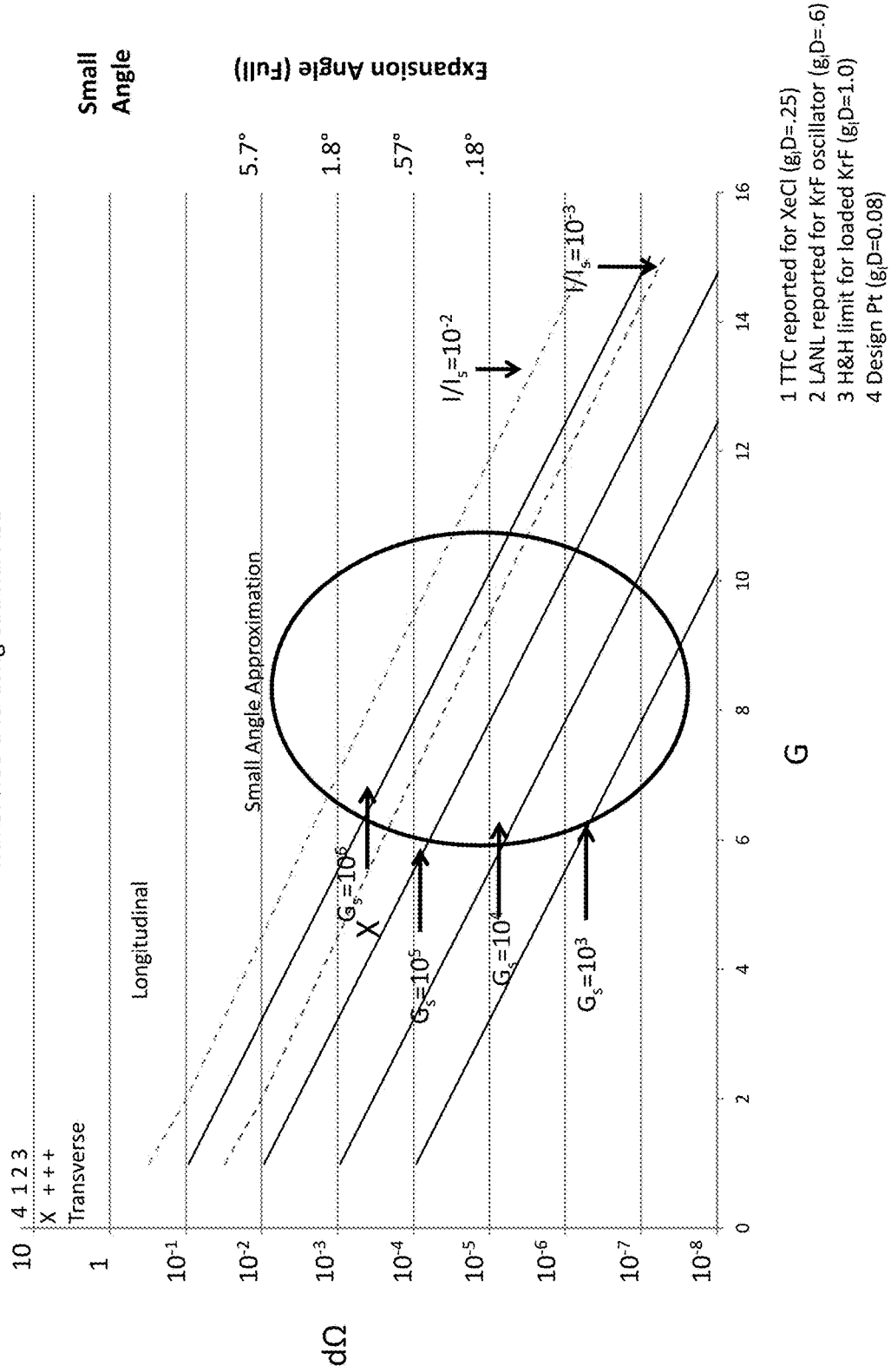
FIG. 14 plots the Amplified Spontaneous Emission (ASE) limitations for KrF.

The efficient extraction of laser energy from a laser medium is of major interest for many laser applications, particularly those where a low cost per unit energy or power is important. For certain lasers, the extraction geometry and efficiency are strongly limited by two phenomena. The first is medium absorption and the second is amplified spontaneous emission (ASE). These tend to apply more strongly at shorter wavelengths (ultraviolet). For the purposes of this discussion, the example of the Krypton-Fluoride (KrF) laser will be used and the geometry is shown in FIG. 13. The limitation due to medium absorption restricts the extracting optical flux, as high fluxes (normalized to a saturating flux) depress the gain and medium absorption becomes appreciable. It is produced both by transient absorbers created by the pumping process and γ donor absorption initially present in the gas mixture. For general discussions, see, for example, R. O. Hunter et al., "Large Scale Discharge Pumped Molecular Halogen Lasers," *AIAA 15th Aerospace Sciences Meeting*, Paper 77-26, 1977; A. M. Hunter, II, and R. O. Hunter, Jr, "Bidirectional Amplification with Nonsaturable Absorption and Amplified Spontaneous Emission," *IEEE Journal of Quantum Electronics*, Vol., QE-17, No. 9, pp. 1879-1887, 1981; T. H. Johnson and A. M. Hunter, II, "Physics of the Krypton Fluoride Laser," *Journal of Applied Physics*, Vol. 51, No. 5, pp. 2406-2420, 1980; L. A. Rosocha et al., "Excimer Lasers for ICF," supra; A. M. Hunter, II, and G. Houghton, "*Single Pulse Excimer Ground Based Laser ASAT Concept Definition Study*," supra; and D. C. Cartwright, "*Inertial Confinement Fusion at Los Alamos: Progress Since 1985*," LA-UR-89-2675, Vol. 1, 1989; on the effects of medium absorption and/or ASE. In particular, FIG. 2-27, on p. 2-61 of "*Single Pulse Excimer Ground Based Laser ASAT Concept Definition Study*," supra, shows a calculation of length limitations associated with extraction efficiency in a KrF laser. For this calculation, the medium is placed in a conventional extraction geometry, such as an unstable resonator or collinear amplifier. Likewise, FIG. 1 (on p. 5 of Section C, Aurora System Performance) of Chapter V, contained in "*Inertial confinement fusion at Los Alamos: Progress Since 1985*," supra, shows an experimental result on the effects of ASE; as well as "Bidirectional Amplification with Nonsaturable Absorption and Amplified Spontaneous Emission," supra, that contains calculations for the effects of ASE on extraction. The use of expanding optical flows described herein changes these limitations in three regards. First, the overall stage gain for efficient extraction can be increased substantially to values in excess of $10^5$ from the previous values of $10$-$10^2$; second, efficient extraction may be obtained from a much larger gain—length product and hence volume laser medium; and third, the optical area may be greatly reduced at a given energy due to a higher energy per area (fluence) output. The overall effect is to make the cost per unit energy much lower and to make such a laser much easier to drive by eliminating amplifier stages. The basis for these improvements is to match the growth of the extracting optical field due to gain to the expansion angle of the optics—this keeps the optical flux near the optimum value for efficient extraction. The optimum value occurs between 0 extraction flux (where the gain is highest but the flux is low) and very high flux where the net gain is reduced to 0, and the optical energy gain due to stimulated emission is balanced by absorption. By matching the expansion angle (such as that due to cylindrical, spherical or anamorphic optics) to the optimum loaded gain, the conditions for near optimum extraction can be maintained over much larger lengths than the near collimated extraction for ICF multiplexing applications (see "*Excimer Lasers for ICF*," supra), and/or collimated or unstable resonator extraction as previously taught. A simple model gives the equation for local generation of optical power as:

$$P_{Optical} = g(\Phi)\Phi,$$

with $g(\Phi) = g_*(\Phi) - g_a$. Here, $g(\Phi)$ is the net gain, $g_*$ is the stimulated emission gain of KrF* and $g_a$ is the absorption loss. The usual two level model for a homogeneously broadened line gives:

$$g_*(\Phi) = \frac{g_*(o)}{1 + \frac{\Phi}{\Phi_{SAT}}}$$

As $\Phi$ and $g(\Phi)$ go to 0, the low flux and high flux limits, respectively, the generated power goes to 0. The optimum $g_{Opt} \Phi_{Opt}$ occurs in between. The maximum local power available is the product of the small signal gain and is the saturation flux, $\Phi_{Sat}$. The optimum extraction flux is $$\left(\left(\frac{g_*(o)}{g_a}\right)^{1/2} - 1\right)\Phi_{Sat}.$$

Figure 8:
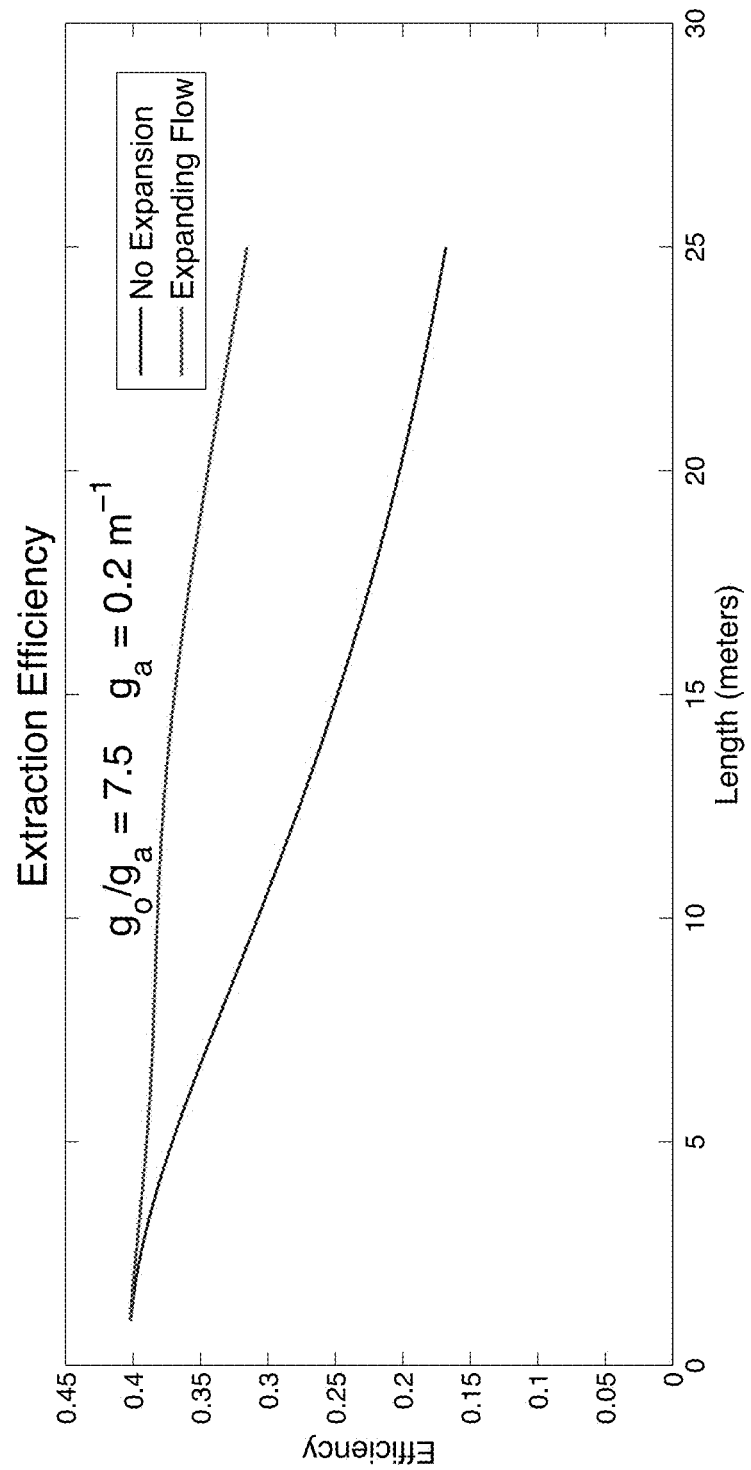
FIG. 8 plots the Optical Extraction Efficiency.
Figure 9:
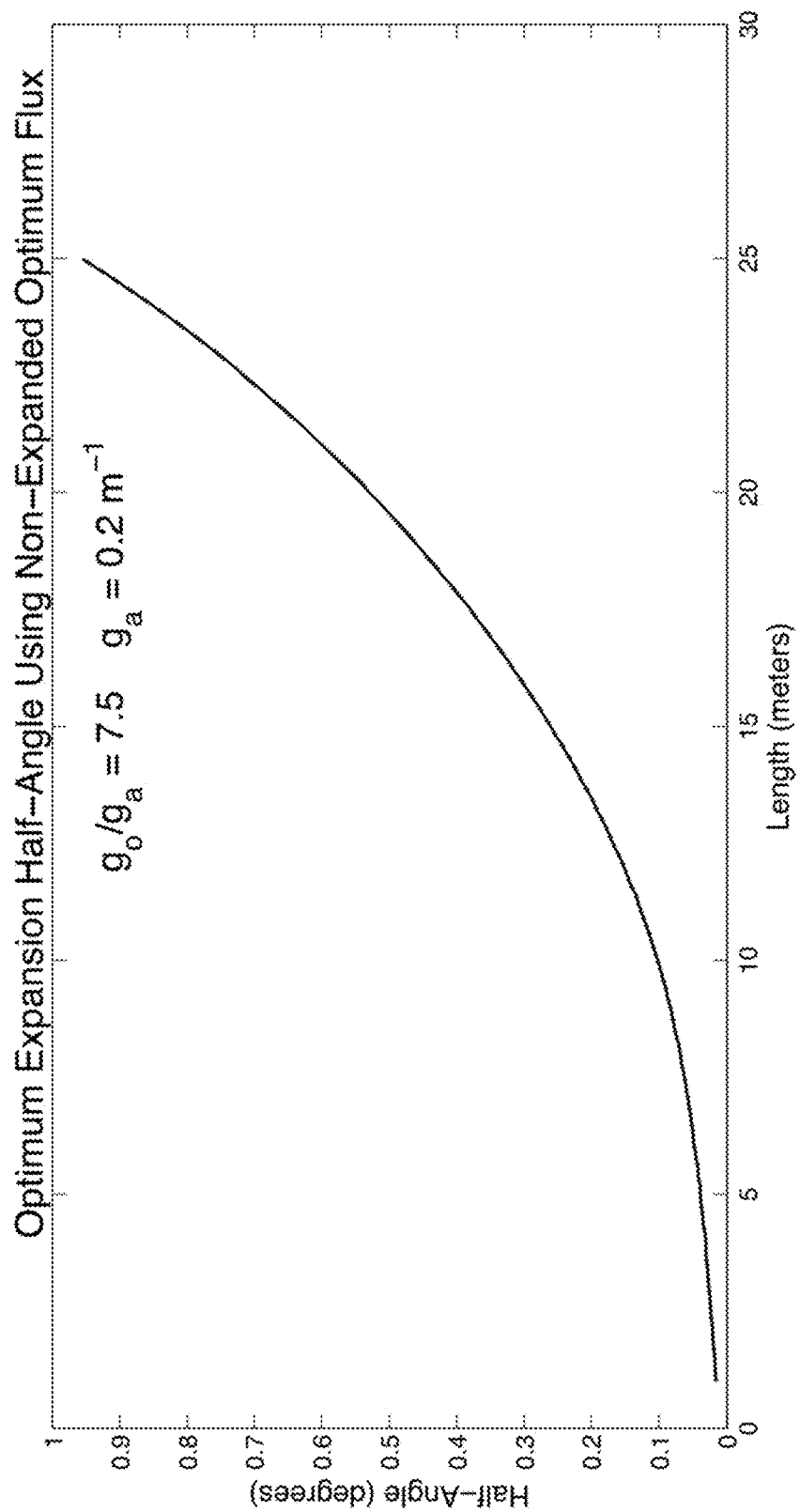
FIG. 9 plots the Optimum Expansion Half-Angle Using Non-Expanded Optimum Flux.

Thus, the maximum local efficiency is:

$$\eta_{Opt} = \left[1 - \left(\frac{g_*(o)}{g_a}\right)^{-1/2}\right]^2$$

and the $g_{Opt} = \dfrac{g_*(o)}{1 + \left(\frac{g_*(o)}{g_a}\right)^{1/2} - 1} - g_a = (g_*(o) g_a)^{1/2} - g_a$ For KrF, $g_*/g_a$ is a complicated function of kinetics, gas mixture and pressure, and pump rate. Typically, it is about 10, leading to peak local extraction efficiencies of some 0.47. However, this is only the local optimum. As the local flux gets larger due to amplification, this efficiency decreases. This leads to a falloff in overall efficiency as the length is increased, as discussed above for FIG. 2-27 on p. 61 of "*Single Pulse Excimer Ground Based Laser ASAT Concept Definition Study*," supra. In FIG. 8, the zero length efficiency is based on the optimum described above. For unexpanded flows, the effect of the increasing flux is shown as a decrease in volume averaged efficiency. By expanding the area of the optical flux to match the increase due to gain, the curves for the expanded flows obtain, and it is clear that for large volumes, a good improvement in the efficiency (on the order of a factor of 2) is obtained. The code used to compute these effects may jointly optimize the expansion angle and injection flux to generate these curves for values of $g_a$. FIG. 9 shows the optimum expansion angles for the different cases of spherical expansion. The gain matching condition for cylindrical and anamorphic optics will be different. In addition, techniques such as spatially varying the saturation flux [different $F_2$ concentrations, for example] or the pumping power may be utilized to improve these simple results.

For an optical flux in cartesian, cylindrical, and spherical coordinates, a simplified set equations of growth due to gain is:

$$\frac{d\Phi(x)}{dx} = g\Phi(x), \text{Rectangular}$$

$$\frac{1}{r}\frac{d(r\Phi(r))}{dr} = g\Phi(r), \text{Cylindrical}$$

$$\frac{1}{r^2}\frac{d(r^2\Phi(r))}{dr} = g\Phi(r), \text{Spherical}$$

From inspection, for positive gain, the rectangular case has always growing $\Phi$ for positive g. For the cylindrical, and spherical cases, the matching condition is found at:

$$\frac{d\Phi}{dr} = 0.$$

This leads to $$\frac{1}{r}\left[r\frac{d\Phi}{dr}+\Phi(r)\right]=g\Phi(r),$$

and $gr_c=1$ Matching condition, cylindrical expansion $$\frac{1}{r^2}\left[r^2\frac{d\Phi}{dr}+\Phi(r)2r\right]=g\Phi(r)$$

$gr_s=2$ Matching condition, spherical expansion

Figure 10:
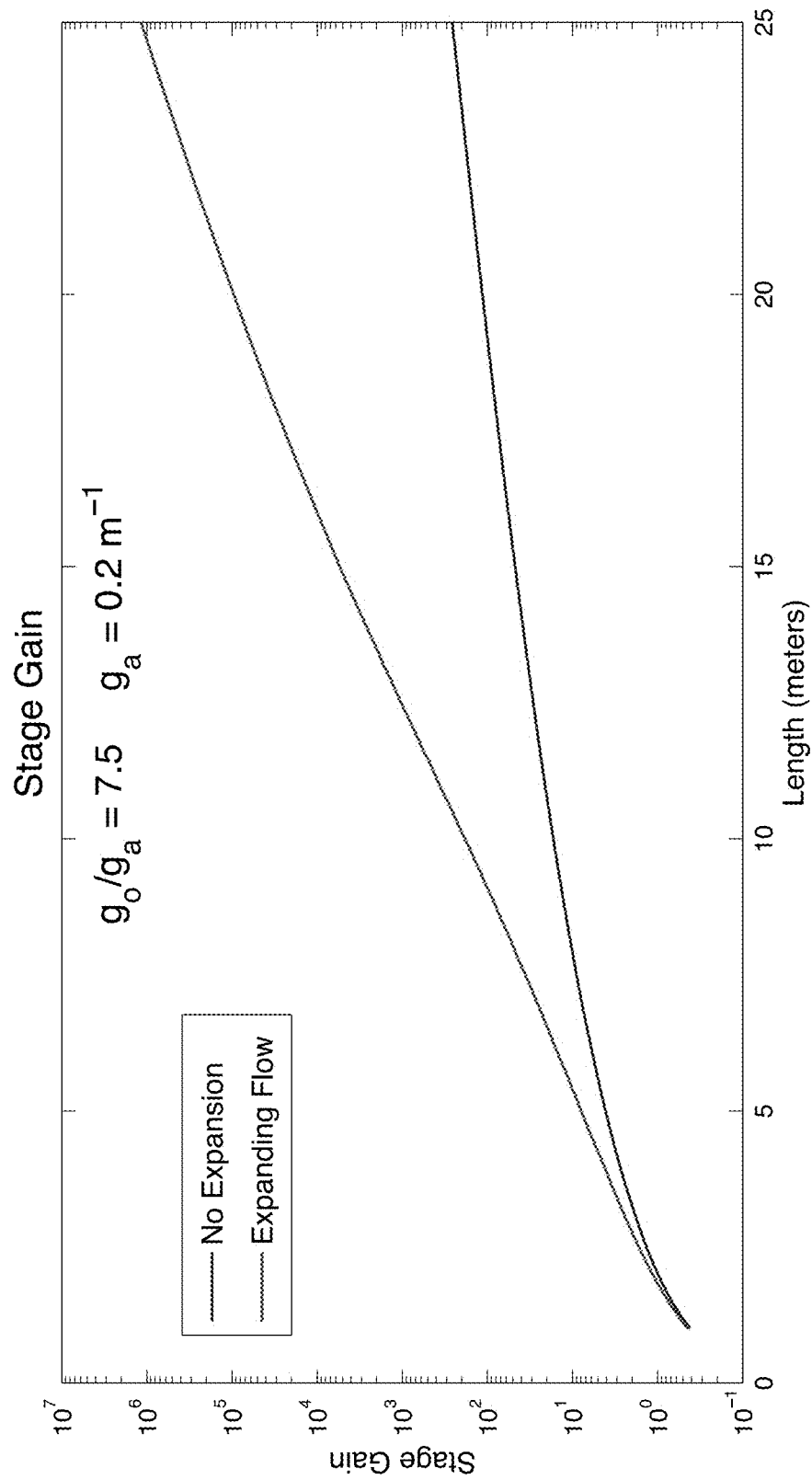
FIG. 10 plots the Stage Gain for Spherically Expanding versus Collimated Optical Flow.
Figure 11:
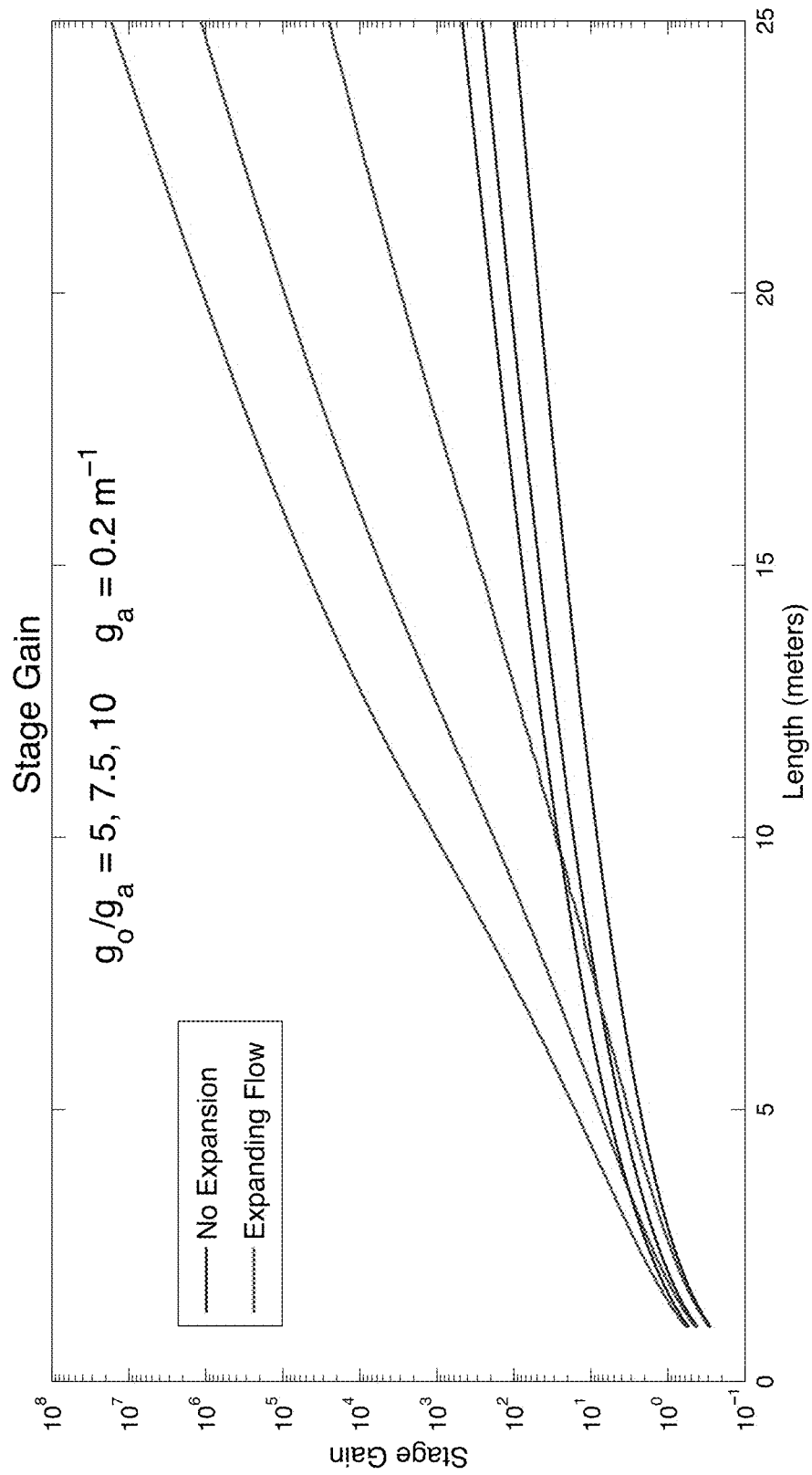
FIG. 11 plots the Stage gain for three cases of gain to absorption.

At those conditions, the g can be set at $g_{Opt}$, and the resulting r gives an idea of the proper expansion conditions. For one KrF case, $g_{Opt}$ is about 0.35 m$^{-1}$. This gives $$r_s=\frac{2}{.35\ m^{-1}}$$

for the spherical case and $$r_c=\frac{1}{.35\ m^{-1}}$$

for the cylindrical. At these values of r, the geometric expansion produces a decrease in Φ that exactly balances the gain in Φ. For larger values of r, the gain is decreased below its optimum value. In addition, the input flux and path length need to be set to arrive at the optimum flux at that point. The extraction efficiency does not fall off rapidly as Φ goes above $\Phi_{Optimum}$; hence, the falloff in efficiency is fairly small. FIG. 8 shows the results of a code that optimizes expansion angle in terms of overall extraction efficiency for a single pass spherical expansion with an optimum flux injection level. The top curve is for a loaded gain optimum of about 0.35 m$^{-1}$, or, a $r_s$ value of 5.71 meters. There is no appreciable fall off in efficiency until the length gets to about 10 meters. FIG. 9 shows the optimum expansion half angle. FIG. 10 shows the stage gain for the same case. FIG. 12 shows the optimum expansion angle and stage gain for two other value of $g_O/g_a$ as well. Note that at a stage gain of 10$^5$, the extraction efficiency is still high (20 meter length).

Since the primary matching condition is for $gr_{Opt}$, $g_{Opt}$ can be varied as a function of r by varying any factor that affects $g_{Opt}$. One is the gas composition. For example, the F$_2$ concentration affects both $\Phi_{Sat}$ and $g_{Opt}$ (it contributes to both excited state quenching and background absorption). The F$_2$ concentration can be varied along the extraction path. Another simple parameter to vary is the pumping rate. At these pumping rates in KrF, the gain is close to linear in the pump rate. The $g_o/g_a$ ratio will vary some, but is a weaker function of pump rate. A simple model may then tailor $g_{Opt}$(r) to match the geometric expansion. For electron beam pumped KrF, a simple way to vary the local pumping rate is to change the local fast electron deposition rate by varying the current density in the electron beam diode region. In any case, small volume extraction efficiency may be approached in much larger volumes than previous techniques.

The effect of parasitic transverse ASE on extraction efficiency may be simply estimated. The examples case for two ended spherical extraction as shown in Table 3. For a <$g_o$ D> of 0.4, FIG. 18 (p. 396 of "*Scaling of KrF Lasers for Inertial Confinement Fusion,*" by Allen M. Hunter II, Robert O. Hunter Jr., and Thomas H. Johnson, Journal of Quantum Electronics, Vol. QE-22, No. 3, March 1986) would indicate a maximum transverse ASE of about 0.1 $\Phi_{SAT}$; this would reduce the integrated gain of the first some 10 meters of path length by a factor of about 2. This total gain decrement would need to be made up by raising the injection flux. The overall stage gain would then go from 1.2×10$^5$ down to 1.2×10$^4$ and the injection flux up to 0.3 $\Phi_{SAT}$.

The expansion angle can be changed by intermediate lenses. This has the effect of adjusting r in the matching condition as $g_{Opt}$ r=1 or 2, and $g_{Opt}$ can be changed.

Also, by using an optically expanding beam, the solid angle may be reduced that the spontaneous emission is radiated into. This decreases the ASE. One simple formula for low aspect ratio geometries for ASE (see FIG. 1) is:

$$d\Omega=\frac{4\pi}{F.Y}\frac{(e^G G)^{1/2}}{(e^G-1)^{3/2}}\frac{I_{ASE}}{I_{Sat}}$$

where d Ω is the solid angle (steradians), F.Y. is the fluorescence yield (typically 0.3 for KrF), G=g L, $I_{Sat}$ is the saturation flux (watts/cm$^2$), and $I_{ASE}$ is the flux (watts/cm$^2$) due to ASE. As a criterion, the ratio of $I_{ASE}/I_{Sat}$ is set at 10$^{-2}$, so less than 1% of the extraction is due to unwanted ASE, at a solid angle of d Ω=10$^{-4}$ steradians (corresponding to a spherical expansion angle of about 0.57° with a square aperture), G can be 9.5. The overall stage gain $G_s$, where $G_s$ is defined as the area ratio of the output to the input beams times the gain factor in the medium is around 1.3×10$^5$. Using FIG. 1, this gives $$G_s=\left(\frac{D^2}{d^2}\right)e^G.$$

The transverse ASE will limit gD, since it radiates into a large (~2π steradians) solid angle and should be 0.5 or below [see, for example, "*Inertial confinement fusion at Los Alamos: Progress Since* 1985," supra; "*Single Pulse Excimer Ground Based Laser ASAT Concept Definition Study,*" supra; "Bidirectional Amplification with Nonsaturable Absorption and Amplified Spontaneous Emission" supra, (J55), "Sealing of KrF Lasers for Inertial Confinement Fusion," supra (J57).

The application of such optical flows to efficient energy extraction is shown in FIG. 1. A two-sided geometry is shown. At the first end (i.e., side 1), a rectangular plane wave 100, passes through cylindrical input lens 110 into gain medium 150. Gain medium 150 is shown as a rectangular parallelepiped region, as is characteristic of certain electron beam pumped KrF lasers. Any aperture shape, such as circular, rectangular, etc., can be used. The beams are amplified as they pass through the gain medium 150 and then exit the gain medium through cylindrical output lens 112 as a collimated output beam 142. Respectively, at the second end (i.e., side 2) a rectangular plane wave (not shown), passes through cylindrical input lens 122 into gain medium 150 and exits through cylindrical output lens 120 as a collimated output beam 140.

Figure 2:
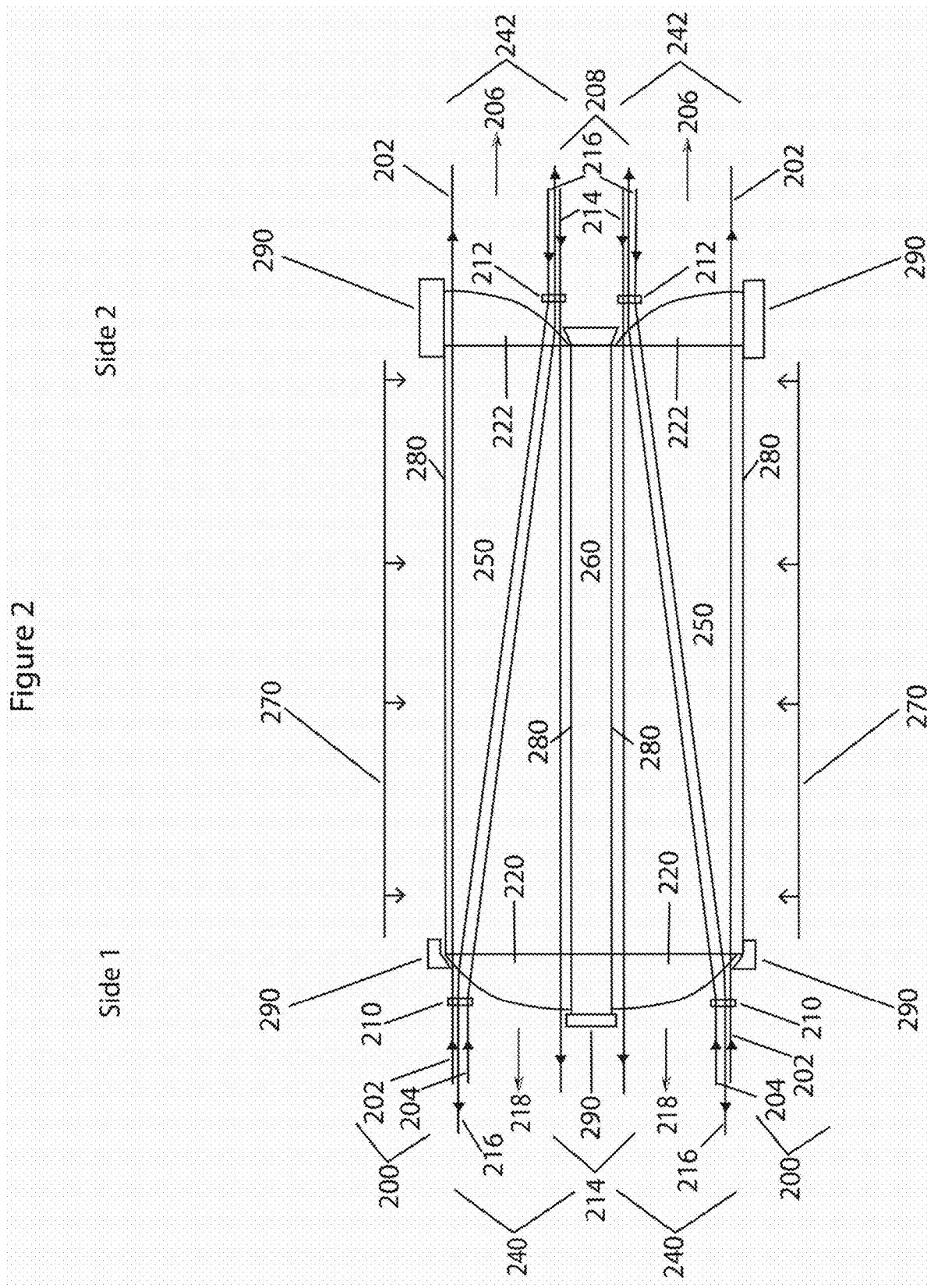
FIG. 2 illustrates an embodiment of an expanding flow optical configuration made in accordance with the present invention.

FIGS. 2 and 3 show a particular configuration for spherical expanding beams. FIG. 2 illustrates a side view and FIG. 3 illustrates an end view of side 1 (exceptions noted) of the expanding flow configuration of FIG. 1. At the entrance (side 1), collimated, small dimension, KrF input beam 200 with exemplary rays 202 and 204 pass through expansion optic 210, and then through figured output windows 222. Similarly, on side 2 collimated, small dimension KrF input beam 208 with exemplary rays 214 and 216 pass through expansion optic 212 and exit the gain media 250 through figured output window 220. Expansion optics 210/212 are figured to take into account the optical figure of windows 222/220 so that on exiting gain medium 250, they fill the output aperture. Thus, ray 202 of input beam 200 is shown traversing the margin of gain medium 250 while ray 204 of input beam 200 is shown diagonally traversing gain medium 250 and arriving on the opposite side of the output aperture. This illustrates the expansion of small input beam 200 into a full aperture output beam 242 on side 2. Output ray 206 is the central ray in output beam 242. Side 1 or input component of 206 is not shown. Output beam 242 is collimated as a result of passing through figured output window 222. The analogous description given above also applies to the input beam 208 incident on side 2 and its corresponding output beam 240 which exits side 1. Both input beams expand to fill their entire output apertures and both are amplified within gain medium 250 before exiting their respective output apertures. The gain medium 250 is shown as a rectangular parallelepiped region, as is characteristic of certain electron beam pumped KrF lasers. Any aperture shape (circular, rectangular, etc. can be used). Instead of using figured output windows 220/222 to recollimate output beams 240/242, flat windows could be used and amplified output beams 240, 242 may be recollimated using optics (mirrors, refractive optics or catadioptric arrangements) which do not seal in gain medium 250.

Figure 4A:
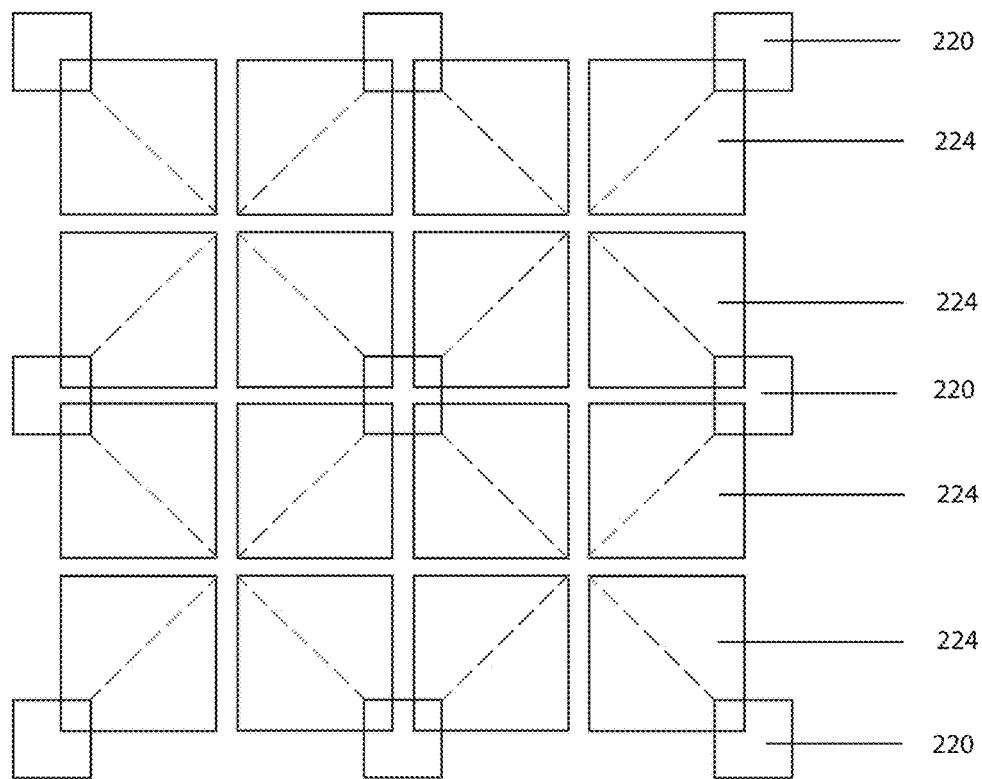
FIGS. 4a and 4b show first and second end views, respectively of extended multiple cells.
Figure 4B:
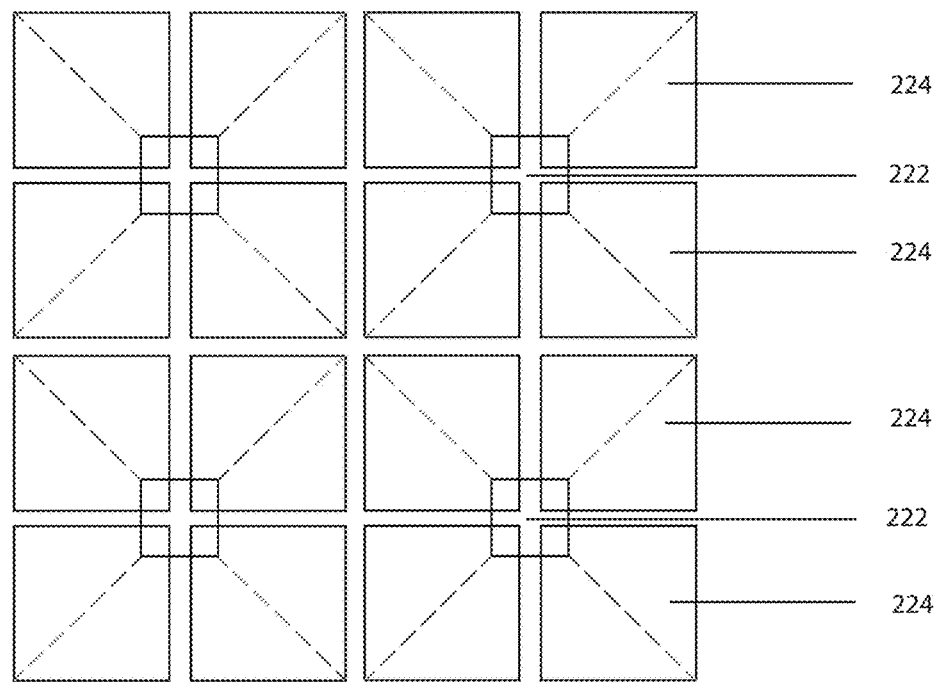

With anamorphic optics, expanding in two different axes at two different rates, a result between pure spherical and pure cylindrical is expected. Table 1 below shows pure cylindrical, pure spherical (FIGS. 2, 3 and 4) and spherical with various tiling methods (FIGS. 5, 6 and 7). FIG. 4 shows how the arrangements of FIGS. 2 & 3 can be tiled together in a manner that individual output apertures 220 of relatively modest size (~40 cm) can extract gain from a transversely large (many meters) gain medium 250. FIGS. 5A-5D show various arrangements of the aperture alignment on side 1 (solid line) and side 2 (dashed line). FIG. 5A represents expanding beams incident from one side only (side 1 for instance). FIG. 5B corresponds to the alignments of FIGS. 2-4 where the rectangular apertures of sides 1 (solid line) & 2 (dashed line) coincide with one another and are not transversely offset. In FIGS. 5C & 5D, side 2 is transversely offset by half the height and half the width of the output aperture (5C) or by half the width of the output aperture. The resulting geometric fill factors are shown in table 1. FIGS. 6A-D/7A-D apply to hexagonal/triangular output apertures respectively with table 1 enumerating the geometric fill factor, □. With a combination of hexagonal tiling and graded pumping, an overall energy weighted extraction would be 0.75 (tiling only) and about 0.9 with pumping at different rates along the path length. This design would retain very high stage gains (approximately $10^5$) for the example shown.

TABLE I

| Region Optical Tiling Methods | | | |
|---|---|---|---|
| | Gs NOMINAL | ηGEOMETRIC | FIG. |
| Cylindrical | Approximately $10^3$ | 1.0 | 1 |

TABLE I-continued

| Region Optical Tiling Methods | | | |
|---|---|---|---|
| | Gs NOMINAL | ηGEOMETRIC | FIG. |
| Spherical | $10^5$ | | 2, 3, 4 |
| Spherical | $10^5$ | | |
| T1 (RECTANGULAR) | | | 5 |
| A (SINGLE ENDED) | | 0.33 | |
| B | | 0.67 | |
| C | | 0.67 | |
| D | | 0.67 | |
| T2 (HEXAGONAL) | $10^5$ | | 6 |
| A (SINGLE ENDED) | | 0.33 | |
| B | | 0.67 | |
| C | | 0.76 | |
| D | | 0.68 | |
| T3 (TRIANGULAR) | $10^5$ | | 7 |
| A (SINGLE ENDED) | | 0.33 | |
| B | | 0.67 | |
| C | | 0.67 | |
| D | | 0.75 | |

Thus, the simplest single ended geometries give an optical efficiency of 0.33 for driving a rectangular shaped gain volume. Two ended drives at least double this efficiency for spherical expansion. Anamorphic optical expansion is anticipated to lie between the approximate 0.7 (spherical) and 1.0 (cylindrical) in terms of geometric coverage. For the nominal case, a large signal gain of some $10^5$ is anticipated for the spherical case (see below), and a cylindrical expansion would produce a gain of approximate $1.5 \times 10^3 - 10^4$ (optimized). The anamorphic optics are expected to give a large signal gain lying between the two cases.

The gain excitation region in KrF may be shaped. If the support of the geometric extraction is occupied with a low density gas (for example: He), then the shaped excitation region would receive 95% of the pumping energy. Hence, even the low fraction (0.67) two ended spherical geometries may be promoted to ηGEOMETRIC of some 0.9-0.95. The range of design choices leaves the detailed technique, or combination of techniques, subject to analysis by a person skilled in the art.

Figure 15:
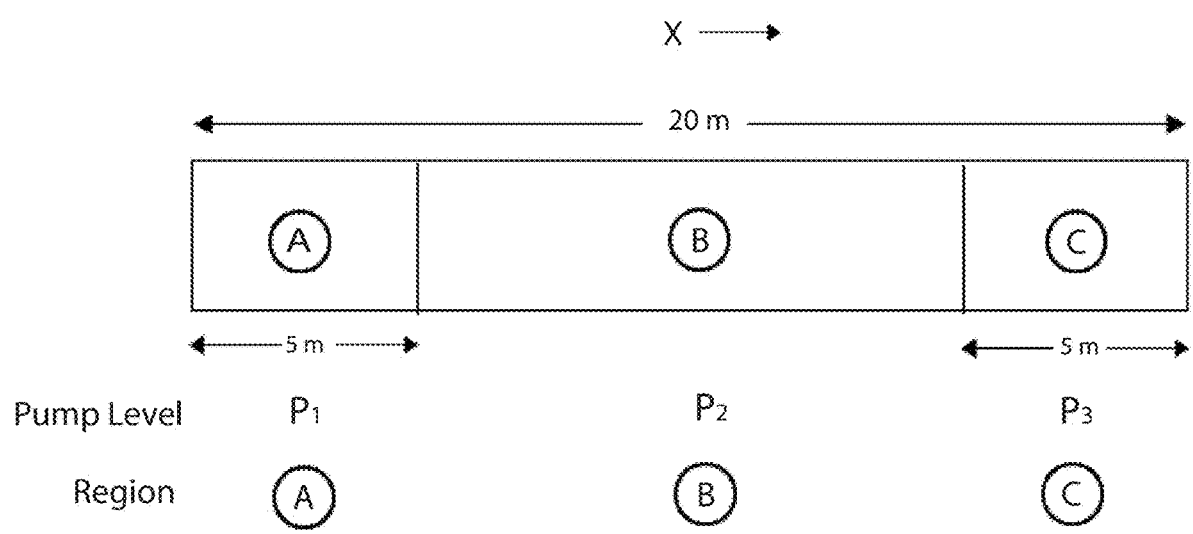
FIG. 15 illustrates a Two Ended Extraction with Distributed Laser Medium Pumping.

Also, for such two ended geometries, the major areal loss for the geometric computation is near the midpoint between the two ends. Hence, pumping this region of at, say, ½ Po, with Po being the average pump rate, and the two end regions at 3/2 Po would give a weighted geometric efficiency of 0.8-0.85 while retaining the large small size gains. FIG. 15 shows this geometry. For large areal expansion ratio spherical expansions, the accessible optical area at each axial position X would look like:

$$A_o(x) = \left[\frac{1}{2} + \left(\frac{X}{L} - \frac{1}{2}\right)\right]^2 \times A_G$$

Here, $A_o$ (x) is the optical volume occupied by tiling with simple rectangular, spherically expanding segments with the input optical area being very small and the output areas occupying both ends in a simple non-overlapping tiling arrangement and $A_G$=full aperture area and L=medium length. Using this approximation, Table 2 shows the overall weighted pumping efficiency, i.e., the amount of the pump energy deposited in the geometrically accessed region.

For the cases shown in FIG. 15, the pump levels are shown in Table 2 for regions A, B and C. FIG. 15 shows a variable pump arrangement with a nominal case of $$\frac{3Po}{2}$$

in Region A and C at $$\frac{Po}{2}$$

in B. In addition, the saturation fluences may be varied. For example, in Region B the $F_2$ concentration could be reduced, leading to a lower saturation fluence and higher gain at the reduced pumping rate of $$\frac{Po}{2}$$

than if the mixture in A and C were being pumped at $$\frac{Po}{2}.$$

The overall stage gain of efficiency of the entire unit may be increased in this fashion. The geometric efficiency is one factor; also, the length scaling due to the exit flux limitation at a few (around 3) saturation fluxes is another. They may be independently or jointly optimized for the two ended extraction geometries.

TABLE 2

| | $I_a$ | $I_b$ | $I_c$ | $P_A$ | $P_B$ | $P_C$ | Accessible Pump Efficiency |
|---|---|---|---|---|---|---|---|
| Case 1 | 5 m | 10 m | 5 m | $\frac{3Po}{2}$ | $\frac{Po}{2}$ | $\frac{3Po}{2}$ | .83 |
| Case 2 | 5 m | 10 m | 5 m | $2P_o$ | 0 | $2P_o$ | .91 |

For these exemplary cases, the pump efficiency is increased to 83% by the case 1 weighting and 91% by the case 2 weighting. The stage gains and extraction efficiency will be optimized separately for input and output flux. In addition, since at the center (10 meters for the exemplary case) the optically occupied geometric area is ½ the geometric area, a localization of the pumping, such as filled balloons or structuring of an election beam spatially, may be utilized to increase the local pumping efficiency. Balloons refer to a light, electron beam transparent, minimal absorption, gas encased by a Kapton® or polyimide film structures. Such regions may be extended towards the ends and the efficiency of the pumping up to 1 limited by the complexity of the shapes (balloon or electron beam) involved. These techniques may be used simply or in combination to increase the coupling efficiency for such two ended extraction.

The main variations have to do with the type of optics and how they overlap and/or pack in the gain medium. The laser extraction can be applied to pulsed lasers and optical compression as well as the linear, quasi continuous wave type as discussed. Various colors and temporal overlap formats can be utilized. All types of laser media (liquid, solid, gaseous) can be utilized. The input beams can be angularly varied and can have color change during the extraction period. The simplest variants for the basic extraction are spherical and cylindrical (expansion in one dimension) input optics. The input and output apertures can have a variety of shapes. For efficiency purposes, the pumping rates can be varied throughout the laser media, including the extraction and gain parameters (see copending application "*Lookthrough Compression Arrangement*", supra.). Wavefront control and adaptive optics may be implemented before and/or after the pass through the gain medium. More than one pass through the medium may be practicable to get to very high gains.

A multiplicity of input and output beams may be used in a given gain medium. This class of expanding beam extraction may lead to ideal small volume performances and efficiency levels over much larger volumes than are otherwise obtainable. To control the transverse (perpendicular to optical path) ASE, the gain medium may be partitioned with absorbing regions and/or separated into multiple medium segments, each with its own associated expanding flow extraction optics. FIG. 13 illustrates the Amplified Spontaneous Emission (ASE) geometry for Krypton-Fluoride (KrF). KrF is a strong radiator in the ultraviolet wavelengths. There are various ASE limitations such as when low aspect ratio (L/D) amplifiers are used for optical multiplexing for pulse compression. For transverse ASE, gD<1. For longitudinal ASE, in high aspect ratio (L/D>>1) sections, $$I = \varphi I_s \left(\frac{d\Omega}{4\pi}\right) \frac{(e^G - 1)^{3/2}}{(e^G G)^{1/2}}$$

wherein G=Gaussian linewidth; $\phi$=fluorescence yield=3; and $I_s$=saturation flux.

$$d\Omega = \text{solid angle} = \left(\frac{D}{L}\right)^2,$$

wherein G=gL=gain length product (nepers)

$$A_i \approx d^2 \text{ and } A_o \approx D^2$$

$$StageGain = \frac{A_o}{A_i} e^G \equiv G_s$$

FIG. 15 plots the transverse and longitudinal ASE limitations for KrF, wherein x is a large pump module design point, L=20 meters and D=0.37 meters.

$$d\Omega = \frac{4\pi}{.3}\left(\frac{I}{I_S}\right)\frac{(e^G G)^{1/2}}{(e^G - 1)^{3/2}}$$

For an expanding flow, $$d\Omega = \frac{G_S}{4 \times 10^6 e^G}$$

In FIG. 9, the optimum expansion angle changes as a function of the laser medium parameters. To compensate for varying laser medium parameters, the angle can be varied versus time to maintain peak extraction efficiency. For example, as donor burnup in KrF occurs during the pulse, $g_a$ and $g_o$ and $\Phi_s$ will change. FIG. 9 shows the effects of changing $g_a/g_o$ at fixed $g_a$ and indicates that for a 20 meter device about a 1° half angle change would optimize the output over a 2:1 change in $g_o$. The output would have its focal characteristics change; the input beams can be matched by having its focal position changed as well to keep the output beam collimated after passing through the figured window. Obviously, the degree of change of expansion angle depends on the extraction length and excursion in the laser characteristics. For the example being considered in FIG. 9, a factor of two in $g_a/g_o$ could be accommodated. The change in focal properties can be handled discretely or continually, depending on the modulation available. A simple version is digital modulation by generating several input beams of shorter pulse length, placing the desired focal length on each beam, and adding them together so they form a continuous input pulse of several discrete focal lengths. The input beam is then transported to the input window and enters the medium. The apparent focal length position is adjusted to keep the output window filled.

The optical expansion angle is optimized against a certain set of laser and pump parameters. The angle can be changed during the pulse to continuously match the evolving medium parameters. The basic requirement is to match the optical expansion rate (near cylindrical or near spherical wavefronts) to the loaded medium gain to optimize optical extraction efficiency over a large volume. Any effects that compete with the extraction, such as oscillation due to diffractive coupling or reflective (such as coating) coupling or scatter that is amplified into unwanted angles that lead to extraction competition must be kept to a tolerable level. The consideration leads to constraints on optical surface finishes, dust and/or inclusion scatter, optical element scatter due to volume index fluctuations, placement and reflectivity characteristics of any boundaries on elements near the optical path, and any other possible sources of competing light. As displayed in Table 3, the injected flux ($\Phi_{In}$) can be low in two ended optical flows. In low flux amplifying regions with low injected, the effects of any other light (ASE, amplified scatter, etc.), can be quite appreciable. Thus, an overall, self-consistent analysis and/or experimental investigation is needed.

D. General Variations

In all of these various techniques, a self-consistent analysis may need to be performed by a person skilled in the art if a high degree of accuracy is desired. Particularly, when the multiple extraction beams overlay in the gain medium, whether due to the counter propagating beams or due to copropagating beams, they will compete for energy extraction.

The preferred embodiment is shown in FIGS. 2 and 3. This example indicates two-ended extraction from a long, thin geometry typical of what can be achieved with a KrF laser. This embodiment is shown in terms of a 20 meter long gain section of dimensions 4×0.4×20 meters. The boundaries 280 perpendicular to the optical axis are metal or plastic (such as Kapton) sheets with relatively low reflectance (~0.05) at the ultraviolet wavelengths where there is appreciable gain (2485 Å±10 Å).

As shown in FIGS. 2 and 3, the window frame mount 290 may occupy a substantial fraction of the optical area. The internal ASE baffling may be extended to shadow that region by using two Kapton sheets to form a region 280 that maps onto the mount structure that is filled with a low density gas, such as He. In this way, the He region 280 will absorb electron beam pump energy 270 at about the 5% level as compared to the laser gas so that the pumping energy is largely concentrated in the desired active region. Electron beam 270 may be pumped at a voltage of 2×10⁶ Volts and current density of 5 Amperes/cm². The Kapton foil will absorb some of the pumping energy, but is very thin (typically 0.001"), and is the equivalent of about 1 cm of laser gas. If a shutter is utilized instead of output windows 220 and 222, this technique may be of value to segment at the chosen ASE limit.

As an illustrative example, when pumped by an electron beam at 50 Kilowatts/cm³ in a 760 torr mixture at 22° C., the total absorption (transient and $F_2$) will be about 0.2 meter$^{-1}$ and the small signal gain about 1.4 m$^{-1}$ (for a typical gas mixture of 708.5 torr Argon, 50 torr Krypton, and 15 torr $F_2$). FIG. 8 shows the optical extraction efficiency. To get to an overall energy efficiency, the efficiency for creation of the upper laser state needs to be included. The creation of an excited state energy of 5 electron volts (the KrF photon energy), divided by 25 electron volts (mean excitation energy) gives 0.2 for the energy efficiency of creating the upper laser state. The optimum extraction half angle is 0.5, or 1° full angle (see FIG. 9). The overall efficiency is the shown optical extraction efficiency of 0.35, taken from FIG. 8. An estimate for the characteristic loaded gain is 0.53 m$^{-1}$. The $I_{Sat}$ is approximately 0.8×10⁶ watts/cm². The code that generates these optimized optical extraction parameters gives an input optical flux of about 0.03 $\Phi_{Sat}$; the output will be about 3 $\Phi_{Sat}$, with an area ratio of output to input of 1.23×10³. This assumes no depletion of the gain by ASE in the lightly loaded region near the window. This corresponds to an overall stage gain of 1.23×10⁵. This estimate is close to the stage gain shown in FIG. 10. It should be noted that experimental work may be needed to optimize these values, especially since the absorptions as a function of wavelength are experimentally unverified at the laser wavelength to high accuracy. In addition, the laser parameters and pumping rates will vary spatially and temporally during the pulse and will lead to variations during the pulse of the laser output.

The physical dimensions are as shown in FIGS. 2 and 3. Table 3 shows the computed parameters for the preferred embodiment shown as well as a comparison.

TABLE III

Computed Parameters for the Preferred Embodiment

| BASIC LASER PARAMETERS | TWO-ENDED EXPANDING FLOWS | SINGLE ENDED UNEXPANDED |
|---|---|---|
| Pump rate | 50 × 10³ watts/cm³ | 50 × 10³ watts/cm³ |
| Mixture | 708.5 torr Ar/50 torr Kr/ 1.5 torr $F_2$ | 708.5 torr Ar/50 torr Kr/ 1.5 torr $F_2$ |
| $g_o$ | 0.014 cm$^{-1}$ | .014 cm$^{-1}$ |
| $g_A$ | .002 cm$^{-1}$ | .002 cm$^{-1}$ |
| $g_o/g_a$ | 7.0 | 7.0 |
| $I_{Sat}$ | .83 × 10⁶ watts/cm² | .83 × 10⁶ watts/cm² |
| D | .4 meters | .4 meters |
| L | 20 meters | 20 meters |
| $\Phi_{In}$ | .03 $I_{Sat}$ (each end) | ~3 $I_{Sat}$ |
| $A_{In}$ | 1 cm² | 1600 cm² (one end) |
| $\Phi_{Out}$ | 3 $I_{Sat}$ (each end) | ~.5 $I_{Sat}$ (one end) |
| $A_{Out}$ | 1600 cm² (each end) | 1600 cm² (one end) |
| Optical Extraction efficiency | .35 | .14 |

TABLE III-continued

Computed Parameters for the Preferred Embodiment

| BASIC LASER PARAMETERS | TWO-ENDED EXPANDING FLOWS | SINGLE ENDED UNEXPANDED |
|---|---|---|
| Gain ($e^{<ge>}$) | $10^2$ | 30 |
| Stage Gain | $1.2 \times 10^5$ | 30 |

Notice that the preferred embodiment includes a large (0.8 meters) output aperture segmented into four sections (see FIG. 3). FIGS. 2 and 3 show a side view and an end view, respectively, of the optical arrangement. Sections of square lenses are used to take the small (1 cm×1 cm) individual inputs and expand them at the correct 1° full angle with a square cross section. At the other end of the gain medium, the output window is figured with a slight curvature to recollimate the light after amplification. The segment sizes are chosen to give low cost. The optical surfaces are coated to have minimal reflectivity. Given this is a KrF electron beam pumped laser, the plastic curtain material that forms the optical area boundary is Kapton [see "*Single Pulse Excimer Ground Based Laser ASAT Concept Definition Study*," supra, although it could be a large number of $F_2$ compatible films and/or metal foils. For injection through a window, the curvature of the input lenses is compensated for the curvature of the window surface it passes through. An obscuration is projected onto the input beams to keep the counter propagating flux out of the region where the light is first amplified by the medium from the opposite beam. In other words, the two beams never overlap geometrically. This feature, and the $g_1$ D product of 0.4 keeps the transverse ASE down and also keeps the ASE and beam loading from the other beam from depressing the gain in the initial lightly loaded region (the input flux is only 0.03 $I_{Sat}$ in this design). The design parameters may be adjusted with experimentation to ensure this region remains unloaded; otherwise, the input fluxes can be raised to compensate for lower than calculated gain in the regions they first encounter. The excitation mechanisms from the electron beams, in the core for irradiating the medium, are well known. Hence, the means of producing the gain are not further discussed other than to say they are suitable to generate the laser parameters. The input beam and optics are also designed to avoid diffraction effects. The KrF wavelength is short (0.25 microns) and at 20 meters, has a Fresnel number one spot size of diameter $2.3 \times 10^{-3}$ meters. Diffraction is undesirable as it modulates the intensity and can be controlled through apodization, imaging, etc. The density fluctuations and consequent index fluctuations in the medium need to be controlled so that the light paths remain well defined. An estimate would be $$\frac{\Delta \rho}{\rho}\bigg|_{rms}$$

is on the order of $10^{-3}$. Since the extraction is dependent on matching the desired gain, and the gain and absorption can vary in time with the fixed (during pulse) optical extraction geometry, these are design limitations. From the above, a skilled practitioner of the art can formulate specific design specifications.

E. Further Variations

A second aspect of the invention would be where lenses are used to expand the input beams. Two-ended injection can cover a volume with slower variation in optical flux.

A third aspect of the invention has no material windows for the output fluxes. Recollimation may be accomplished with curved mirrors or the means before further beam handling is made. Shutters or other aerodynamic means can be used. This avoids the cost and complication of the output windows.

A fourth aspect of the invention is for liquid or solid gain mediums.

A fifth aspect of the invention is for a double pass arrangement in which the input beam is amplified prior to being expanded or is expanded from a small spot.

A sixth aspect of the invention is where baffling is placed in the medium to isolate each beam path from another.

A seventh aspect of the invention is where the beam paths overlap.

An eighth aspect of the invention is as in the preferred embodiment, with the addition of programmably (or with feedback) changing the expansion characteristics during the time of extraction parameters change.

A ninth aspect of the invention, as in the preferred embodiment, with programmable spatially varying pump properties to compensate for time varying laser parameters.

A tenth aspect of the invention where the lower pumping is spatially varied to optimize extraction efficiency.

An eleventh aspect of the invention where the kinetic and saturation properties are spatially varied to optimize extraction efficiency.

The invention claimed is:

1. A system for expanding optical flow for laser extraction, comprising:
    two input beams that roughly counter propagate;
    two expansion optics to receive each of the two counter propagating input beams, wherein the expansion characteristics of the two expansion optics are selected in order to maximize the optical extraction efficiency;
    one or more gain mediums to receive the counter propagating input beams from the expansion optics to form two amplified propagating beams, wherein the one or more gain mediums comprises: a plurality of arrays that are separated by an absorbing buffer region to isolate the one or more gain mediums in order to diminish the effects of amplified spontaneous emission; and
    two output optics to receive the two amplified propagating beams after passing through the gain medium.

2. The system of claim 1, wherein the expansion optics are one of the following shapes: cylindrical, spherical or anamorphic.

3. The system of claim 2, wherein the two input beams are selected during extraction for color, angle, polarization and power level.

4. The system of claim 3, wherein the gain medium is selected from one of the following: liquid, solid or gaseous.

5. The system of claim 4, further comprises figured optical windows and/or external lenses to recollimate the amplified propagating beams from the two expansion optics.

6. The system of claim 4, further comprises mirrors supported for the gain medium by shutters or other aerodynamic means to recollimate the amplified propagating beams from the two expansion optics.

7. The system of claim 4, wherein the two input beams do not geometrically overlap as they roughly counter propagate.

8. The system of claim 4, wherein the two input beams geometrically overlap as they roughly counter propagate.

9. A method for expanding optical flow for laser extraction, comprising:

roughly counter propagating two input beams;

receiving each of the two counter propagating beams at two expansion optics, wherein the expansion characteristics of the two expansion optics are chosen in order to maximize the optical extraction efficiency;

receiving the counter propagating beams exiting the two expansion optics at one or more gain mediums to form two amplified propagating beams, wherein the one or more gain mediums comprises: a plurality of arrays that are separated by an absorbing buffer region to isolate the one or more gain mediums in order to diminish the effects of amplified spontaneous emission; and receiving the two amplified propagating beams after passing through the gain medium at two output optics.

10. The method of claim 9, further comprises receiving each of the two counter propagating beams through cylindrical, spherical or anamorphic expansion optics.

11. The method of claim 10, further comprises selecting the two input beams during extraction for color, angle, polarization and power level.

12. The method of claim 11, further comprises receiving the amplified propagating beams from the two expansion optics through a liquid, solid or gaseous gain medium.

13. The method of claim 12, further comprises recollimating the amplified propagating beams from the two expansion optics with figured optical windows and/or external lenses.

14. The method of claim 12, further comprises recollimating the amplified propagating beams from the two expansion optics with mirrors supported for the gain medium by shutters or other aerodynamic means.

15. The method of claim 12, further comprises preventing any geometric overlapping between the two input beams as they roughly counter propagate.

16. The method of claim 12, further comprises geometrically overlapping the two input beams as they roughly counter propagate.

* * * * *